A. McCARTY.
DROP-BOX FOR PUMPS.

No. 173,318. Patented Feb. 8, 1876.

WITNESSES:
P. C. Dieterich
Wm. Blake Upperman

INVENTOR:
Andrew McCarty
per.
F. H. Alexander
ATTORNEY.

UNITED STATES PATENT OFFICE.

ANDREW McCARTY, OF XENIA, OHIO.

IMPROVEMENT IN DROP-BOXES FOR PUMPS.

Specification forming part of Letters Patent No. 173,318, dated February 8, 1876; application filed November 3, 1875.

*To all whom it may concern:*

Be it known that I, ANDREW MCCARTY, of Xenia, in the county of Greene and State of Ohio, have invented certain new and useful Improvements in Drop-Boxes for Pumps; and I do hereby declare that the following is a full, clear, and exact description thereof, reference being had to the accompanying drawings, and to the letters of reference marked thereon, which form part of this specification.

The nature of my invention consists in the construction and arrangement of a drop-box and valve for pumps, as will be hereinafter more fully set forth.

In order to enable others skilled in the art to which my invention appertains to make and use the same I will now proceed to describe its construction and operation, referring to the annexed drawing, in which—

Figure 1:
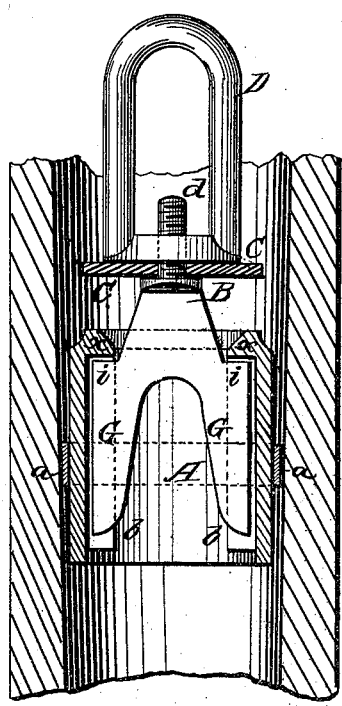
Figure 2:
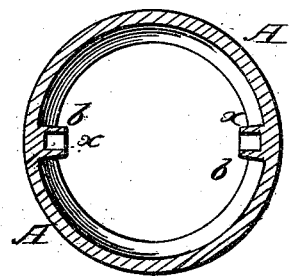

Figure 1 is a central vertical section, and Fig. 2 is a cross-section of box A.

A represents the cylindrical drop-box, provided with suitable exterior packing $a$, and on the inside the box is formed with two vertically-grooved guides, $b$ $b$, directly opposite each other, said guides being formed with stops $x$ $x$ at their upper ends. B represents a circular plate, with screw $d$ projecting upward from the center, on which screw a leather washer, C, is placed, forming the valve, and said washer or valve is held down onto the plate B by a bail, D, screwed onto the screw $d$. From the lower side of the plate B project two wings, G G, which are placed in the guides $b$ $b$, and have shoulders $i$ $i$ to come against the stops $x$ $x$ and prevent the valve from raising too far up from the box. By means of the guides $b$ in the box I am enabled to use a two-wing valve, and one which will not dance or tremble in operation, thereby lessening the friction, and that will repeat in its workings at all times alike, so as to cause a regular and continuous flow of water.

The valve operates in the same manner as ordinary wing-valves. When it is desired to lift the box out of the pump it is done in the usual manner by attaching a hook in the bail D. As this bail is attached to the valve, the valve is first raised, allowing the water above the same to run down, and then it is a very easy matter to raise the box.

I am aware that a four-wing valve, used in connection with a box, and having stops at the bottom of each wing is not new; but in said case, as known to me, the box has no guides; hence the valve is liable to tremble or turn about, thereby causing friction and an irregular flow of water.

Having thus described my invention, what I claim as new, and desire to secure by Letters Patent, is—

The combination of the box A, having the grooved guides $b$ $b$, with stops $x$ $x$, and the valve B C, with bail D, and wings G G, having shoulders $i$ $i$ at the top, substantially as and for the purposes herein set forth.

In testimony that I claim the foregoing as my own I affix my signature in presence of two witnesses.

ANDREW McCARTY.

Witnesses:
V. MARSHALL,
J. HARNER.